United States Patent [19]

Dunlap

[11] 4,446,959
[45] May 8, 1984

[54] MULTIPLE RAIL LINEAR FEED SYSTEM

[75] Inventor: Clifford E. Dunlap, Pasadena, Calif.

[73] Assignee: North American Philips Corporation, New York, N.Y.

[21] Appl. No.: 310,673

[22] Filed: Oct. 13, 1981

[51] Int. Cl.³ .............................................. B65G 47/24
[52] U.S. Cl. ..................................... 198/382; 198/398
[58] Field of Search ............... 198/382, 396, 398, 609, 198/771, 399, 400

[56] References Cited

U.S. PATENT DOCUMENTS

| 607,941 | 7/1898 | Mayo | 198/398 |
| 2,915,165 | 12/1959 | Bell | 198/400 |
| 3,123,199 | 3/1964 | Easterday et al. | 198/33 |
| 3,301,378 | 1/1967 | Wayne et al. | 198/398 |
| 4,163,487 | 8/1979 | Dupuis | 198/399 |
| 4,175,654 | 11/1979 | Lodge | 198/609 |

FOREIGN PATENT DOCUMENTS

| 16368 | 3/1980 | European Pat. Off. | |
| 434803 | 9/1935 | United Kingdom | 198/446 |

OTHER PUBLICATIONS

IBM Technical Disclosure Bulletin, vol. 22, No. 9, Feb. 1980.

Primary Examiner—Joseph E. Valenza
Assistant Examiner—Daniel Alexander
Attorney, Agent, or Firm—Jack E. Haken; James J. Cannon, Jr.

[57] ABSTRACT

A multiple rail linear feeder system for orienting parts into multiple rows of single file at a high rate without jamming. A dispenser deposits randomly oriented parts along the rear edge of a first stage preliminary orienter plate having multiple channels or rows thereon. The linear vibratory motion of the system angled to the direction of feed effects a first lengthwise orientation. The parts move to a principal feeder plate having slightly angled rails for further orientation by tending to even out the parts lengthwise in each row as they proceed to a discriminator area. A lower reject discriminator hole cut into each rail allows all chips that are misoriented crosswise to fall off the rails. An upper discriminator positioned over said lower discriminator pushes parts on top of other parts sideways into the discriminator reject holes. The parts leaving the discriminator area move along the rails, which now have a flattened track, toward a barrier at the end of the feeder plate which serves as a station for pickup of multiple parts, one from each rail, for further processing.

7 Claims, 14 Drawing Figures

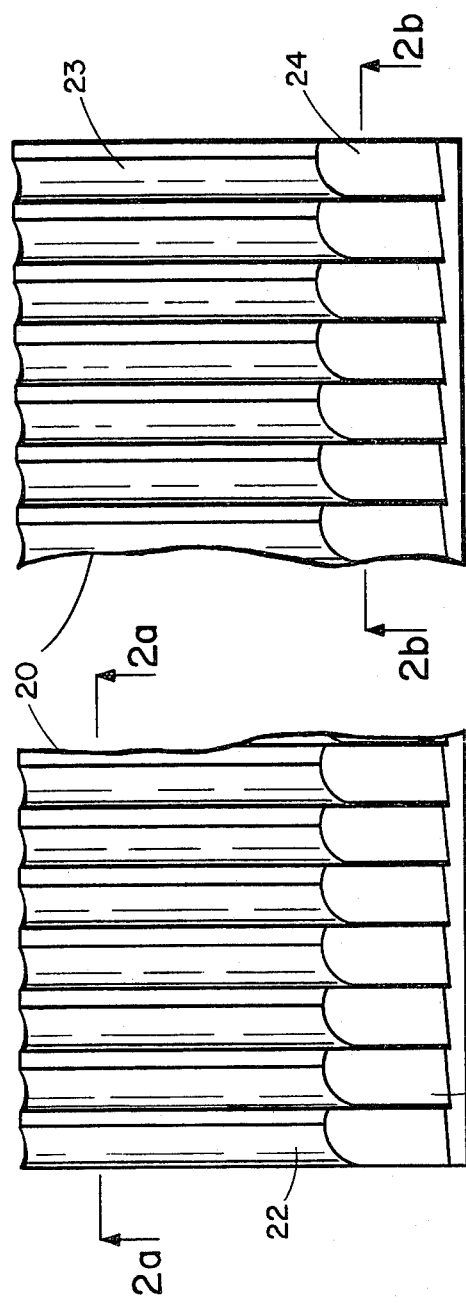
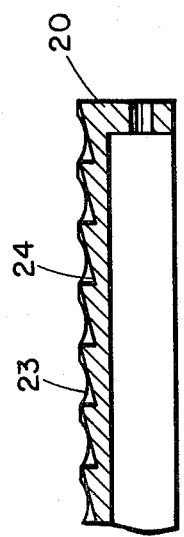
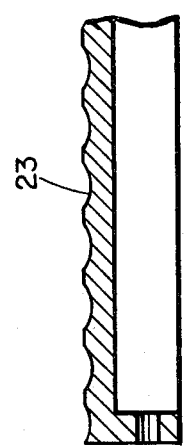
Fig. 2
Fig. 2a
Fig. 2b

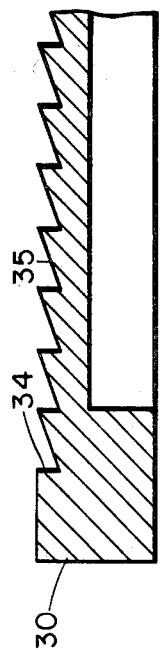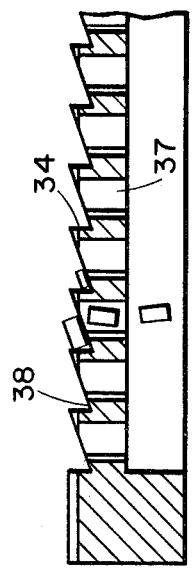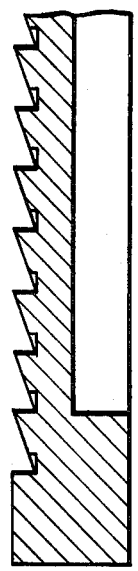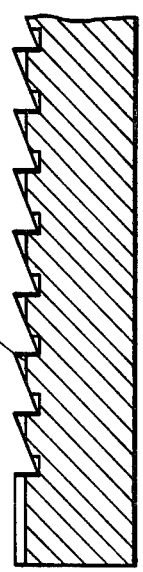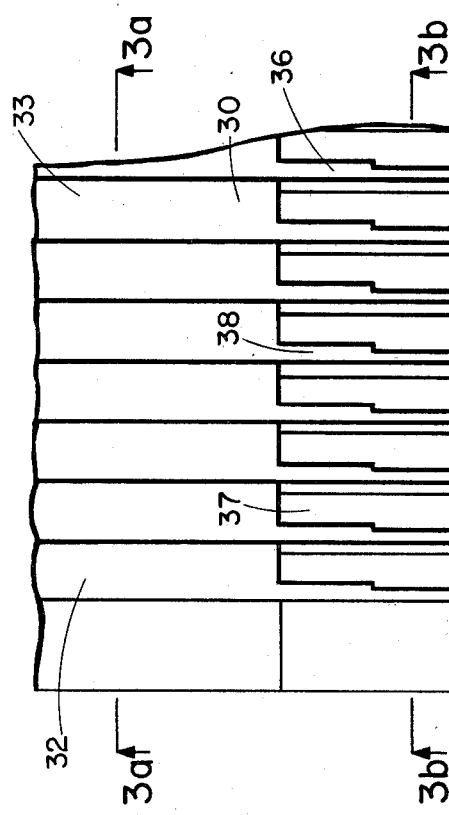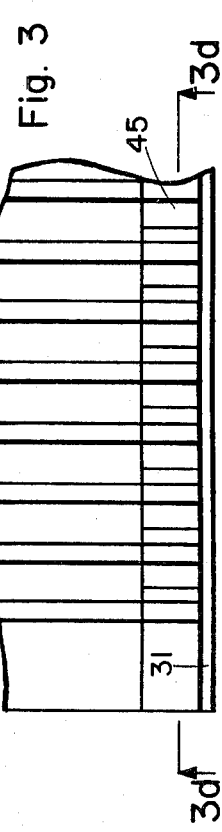

MULTIPLE RAIL LINEAR FEED SYSTEM

BACKGROUND OF THE INVENTION

1. Field of the Invention

This invention pertains to the general field of vibratory feeders which accept randomly oriented parts and through a combination of rails or tracks and vibratory motion feed these parts properly oriented to a station from which they may be selected for the next step in the production work flow, which may be testing, assembly or packaging. Specifically, the invention pertains to a multiple rail linear feed system for leadless electronic components, commonly known as chips, having electrical terminations on two ends thereof. For testing, further assembly and/or packaging, these chips must be correctly oriented so that the leads of each chip in the feed system are in a predetermined position and correctly aligned or oriented so that they may be picked up mechanically in bulk for the next step in the production process.

2. Background of the Invention

Vibratory feeders have been known in the prior art for some time. Most vibratory feeders in common commercial use are of a circular type. Approximately twenty companies sell circular vibratory feeders in the United States. Two commonly used models are the Syntron model manufactured by Syntron Division, FMC, of Homer City, PA.; and the EA model No. 012 manufactured by Engineered Automation, Inc., High Bridge, N.J.

In a typical circular vibratory feeder, parts are dumped into a vibratory cylindrical bowl having upward spiral tracks on its interior side wall. Centrifugal force caused by the vibratory motion of the bowl forces the parts toward the tracks on the inner perimeter of the bowl. Continuing vibratory motion causes the parts to align themselves lengthwise on these tracks. The combination of these motions plus the pressure from more parts moving from the base perimeter of the bowl forces the oriented parts to move upward gradually on the spiral track of the bowl. As the parts move toward the top of the bowl, they gradually become oriented or aligned on the spiral track. However, a significant number of parts will not be properly oriented. To eliminate these parts from the continuous feed system, one or more discriminators are used along the upper portion of the track. Since the parts are uniform in size dimensions, the discriminators are adjusted so that only properly dimensioned and oriented parts pass through the discriminators. Having passed through the discriminators, the parts are then discharged from the bowl in a linear sequence onto a continuous rail, hopefully properly oriented. In some prior art devices, the discharge chute can cause misalignment and a further discriminator is used on the feed rail. Parts rejected by any of the discriminators are fed or dropped back into the bowl for reprocessing. The typical prior art circular vibratory feeder uses a single channel (rail or track) with a highly complex discriminator unit in the feeder bowl. These units have continuing problems with the jamming of parts in the discriminator areas.

The final output of the typical prior art vibratory feeder is a single track of parts continuously moving down a rail in proper orientation to the next step in the production process. Present day feed rates for chip components range from 5,000 to 15,000 parts per hour.

Linear vibratory feeders are not prominent in the prior art. The present invention is believed to be the first commercially feasible linear vibratory feeder for miniature electronic parts.

Prior art vibratory feeder systems have many inherent limitations. Prime among these is the low rate of feed, about 15,000 parts per hour maximum. Automated systems for handling chip components prior to and subsequent to their handling in the feeders currently are geared to a parts flow of 60,000 to 100,000 parts per hour, 80,000 being a desired goal. In the case of circular vibratory feeders, the placement of complex discriminators within the circular vibrating bowl is inefficient and leads to numerous flow problems. The adjustment of the discriminators is very sensitive and requires frequent manual intervention. Even well-adjusted discriminators reject a high percentage of properly oriented parts, contributing to the low feed rate. Retaining the discriminators within the bowl limits the discharge of oriented parts to a single track or rail of output, further contributing to the low flow rate.

The present invention overcomes the limitation of the prior art by introducing multiple linear rails into the feeder system and placing simple but very efficient discriminators on these rails. The use of multiple rails increases output by a factor of ten in the currently preferred embodiment. The only way to increase the output of prior art, single channel feeders is to increase the feed rate. This causes higher reject rates and more frequent jamming. The placement of simple discriminators along the multiple rails combined with a lower feed rate per channel yields a very fast feed system that is virtually jamproof. The prime purpose of the present invention is to orient electronic chips (leadless components) in multiple rows of single file at the rate of 100,000 per hour without jamming problems. This is achieved by using a fifty-plus channel linear vibratory feeder with discriminators in each channel and a single chip dispenser which randomly distributes chips into the fifty-plus channels.

SUMMARY OF THE INVENTION

This invention relates to a multiple rail linear vibratory feeder system which accepts parts in random orientation and orients these parts while feeding them to the next station in a production or packaging operation. The system is specifically designed to handle leadless electronic components as defined in EIA Standards Proposal No. 1460, pertaining to the taping of leadless components for automatic placement, (if approved, to be published as RS-481). Such parts, commonly called chips, include chip capacitors and chip resistors in a general rectangular configuration, though other parts may be handled by the system if they conform to its dimensional restrictions. While the EIA proposed standard applies to the taping of components, the multiple rail linear vibratory feeder of the present invention can be used with parts which are too large for taping under the presently proposed standard.

Chip components have a generally rectangular configuration with electrical terminations on each end of their longer dimension. (Square components, components with terminations along each end of their width, and components having three terminations such as chip transistors, require additional discriminators and handling steps beyond the scope of this disclosure.)

The object of the present invention is to provide a multiple rail linear vibratory feeder system which will accept randomly dispensed non-oriented chips and orient the chips lengthwise into multiple rows of single file at the rate of 100,000 chips per hour without jamming. The chips are oriented as they move down the feeder rails and come to rest at the end of the feeder, from whence they can be picked up by multiple pickup devices, one per channel, for the next production step. At present, this linear feeder system is contemplated to be used to feed a tester, an insertion machine, and a taping machine in accordance with the above-mentioned EIA proposed standard.

The multiple rail linear vibratory feeder system includes six basic components. A random chip dispenser dispenses chips in a random, somewhat metered sequence across the upper rear side of the multiple rail linear feeder while the feeder is vibrating at an angle to the direction of feed. This upper rear side is the first stage preliminary orienter which performs the basic end-to-end orientation. The preliminary orienter has multiple rails, each being a groove milled in a flat plate. The configuration of each groove, in the preferred embodiment, is a symmetrical lower third of a perfect circle. The preliminary orienter is placed at a small angle relative to a feeder rail plate to insure the downward flow of the randomly dispensed non-oriented chips to the main feeder rail plate. The main feeder rail plate provides the second stage of orientation and includes a lower reject discriminator. This stage insures that all chips are properly oriented. The main feeder rail plate has a multiple rails or channels, aligned with those of the preliminary orienter. However, the portion of these rails ahead of the discriminator area are at a small angle relative to the surface of the plate. Each channel or rail includes a discriminator area having a lower discriminator and an adjacent discriminator hole cut into the main feeder plate. The lower discriminator is simply a narrowed rail over which the chip passes. If the chip is not properly oriented, it will simply fall off this narrowed rail, falling through the adjacent discriminator hole to a reject tray. Thus, this lower discriminator eliminates all chips which are not properly oriented. An upper discriminator is attached to the main feeder rail plate over the lower discriminator. This component has angled projections positioned above the rails at a distance equal to the maximum height of a chip. Its function is to separate "doubles", that is, chips laying on top of other chips. Its angled projections move these doubles over at an angle until they fall into the reject hole adjacent to the lower discriminator. After passing through the discriminator area, the chips continue to move along the rails in the forward section of the main feeder plate. In this section the rails now are relatively parallel to the surface of the plate. The chips come to rest in multiple rows of single file, properly oriented, against an end plate. A pickup bar is then able to pick up multiple chips, one from each row, for further processing. The use of multiple rails increases the number of chips available for processing for each cycle of the pickup motion. The movement and orientation of chips along the rails of the multiple linear rail feed system is caused by a vibratory motion of the preliminary orienter and the main feeder plate. In the preferred embodiment, these plates are vibrating at an angle of 45° to the direction of feed. Vibratory blocks and vibratory block holders secured to a base plate are used to effect this motion and secure the feeder plates to the system.

The multiple rail linear vibratory feed system operates as follows. A vibratory feeder or equivalent dispenser randomly deposits chips across the upper rear portion of the multiple rail first stage preliminary orienter. From the inclination of this stage and its vibratory motion the chips then move along the rails to the main feeder rail plate where they are further oriented in its rails by tending to even out into single file lengthwise in each row (rail) until they reach the discriminator area. The lower reject discriminator hole allows all chips that are misoriented crosswise to fall away from the rail. The "doubles", chips that are on top of other chips, are also pushed away into the reject hole by the upper discriminator. The discriminators thus insure that all chips in the multiple rows are properly oriented in single file. The properly oriented chips continue to move in their respective rows (rails), being rotated 15° into a flattened rail after leaving the discriminator area. The multiple rail linear vibratory feed system thus separates and properly orients chips into multiple rows of single file lines. A pickup bar is then able to pickup multiple chips, one from each row, for further processing.

BRIEF DESCRIPTION OF THE DRAWINGS

FIG. 2 is a partially cut-away top plan view of the first stage preliminary orienter of the system of FIG. 1.

FIG. 2a is a cross-sectional view taken along the line a—a of FIG. 2.

FIG. 2b is a cross-sectional view taken along the line b—b of FIG. 2.

FIG. 3 is a top plan view partially cut-away of the feeder rail plate of the system of FIG. 1.

FIG. 3a is a cross-sectional view taken along the line a—a of FIG. 3.

FIG. 3b is a cross-sectional view taken along the line b—b of FIG. 3.

FIG. 3c is a cross-sectional view taken along the line c—c of FIG. 3.

FIG. 3d is a cross-sectional view taken along the line d—d of FIG. 3.

FIG. 4b is a cross-sectional view taken along the line b—b of FIG. 4a.

DESCRIPTION OF THE PREFERRED EMBODIMENT

The multiple rail linear vibratory feeder system of the present invention accepts parts in random orientation and orients these parts while feeding them to the next station in a production or packaging process. The system is specifically designed to handle leadless electronic components, as these components are defined in EIA Standards Proposal No. 1460, dated Dec. 31, 1980 (if approved, to be published as RS-481). Such parts, commonly called chips, include chip capacitors and chip resistors of general rectangular configuration. However, other parts may be handled by the system if they conform to its dimensional restrictions and/or various design limitations. The aforementioned EIA standard pertains specifically to the taping of leadless components for automatic placement. The multiple rail linear feeder of the present invention can handle parts significantly larger than those which can be taped under the present proposal.

Chip components have a generally rectangular configuration with electrical terminations on each end of their longer dimension. In the preferred embodiment, by way of example only, chips ranging from 0.050" length, 0.050" width to 0.700" length 0.700" width may be used. In view of the dimensional tolerances required to make the system function in an automated factory environment, chips are divided into four subranges. For each subrange, two minor modifications are made to the feeder rail plate, one on the size of the reject hole and one on that portion of each rail from the discriminator area forward to the terminal end plate.

Square chips, chips with terminations along each end of their width, chips having three terminations and other special cases, require additional discriminators and/or handling steps which are beyond the scope of the present disclosure. However, the required additions are feasible and compatible with the basic multiple rail linear feed system of the present invention.

In contrast to the prior art, this invention provides a multiple rail, track or channel feed system. The use of multiple rails not only increases the quantity of chips which may be oriented and fed at one time, but it also increases the reliability of the system as well. In a single rail system, the only way to increase the quantity of chips processed is to speed up the system. The result is that a high number of misoriented chips exit from the feeder and a second discriminator system has to be used. In a multiple rail system, the significant increase in quantity justifies a slower processing rate on each rail, thereby improving reliability and simplifying the discriminators. While no limitation is to be implied, multiple rail feeder systems having 50 to 100 rails are technically feasible and commercially viable. The production model of the preferred embodiment has 57 rails, the number being a function of the space available at the interface with other automatic processing machines.

Figure 1:
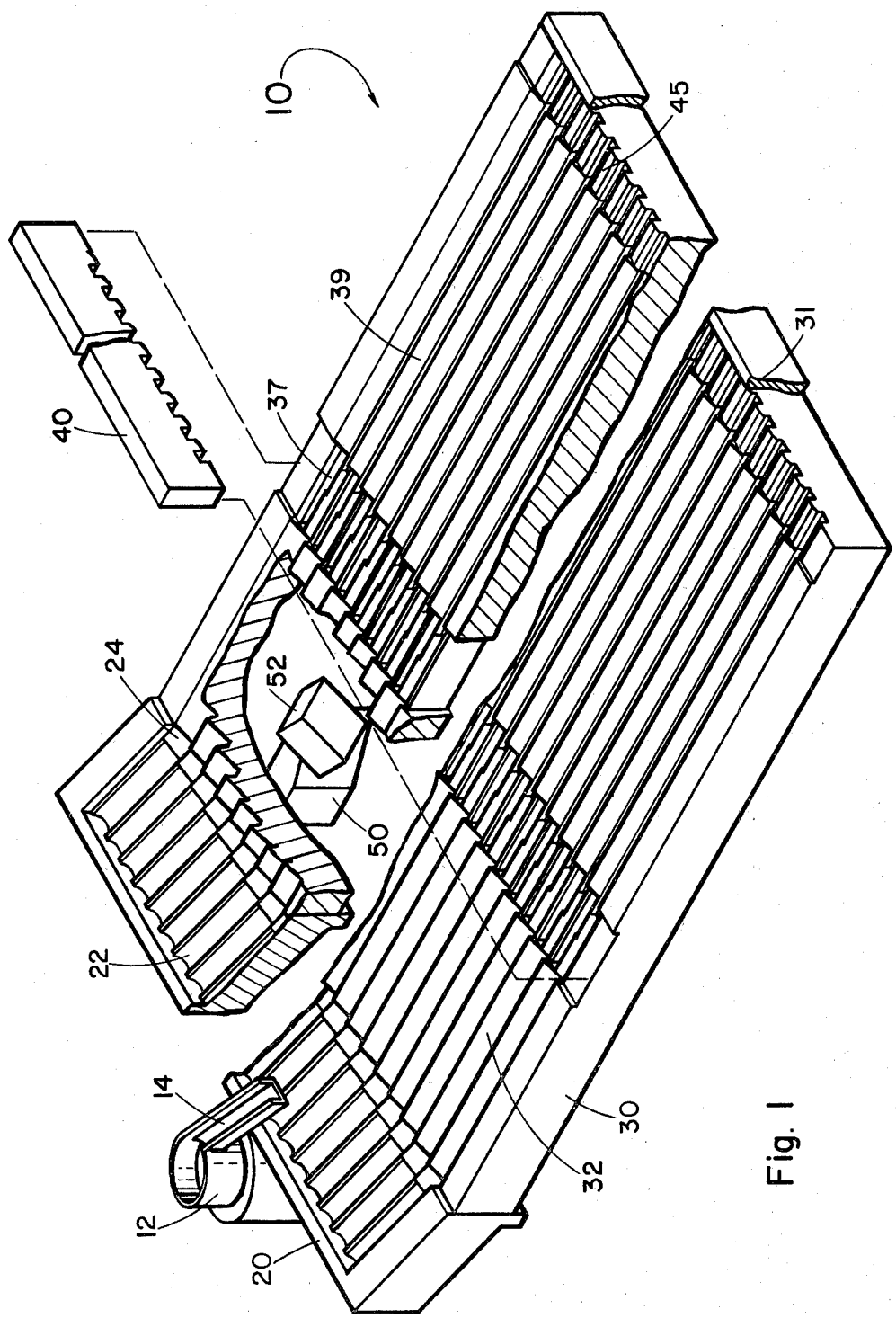
FIG. 1 is a perspective view partially cut-away of the multiple rail linear vibratory feed system of the present invention.

Referring now to the drawings, FIG. 1 is a perspective view of the multiple rail linear vibratory feed system 10 of the present invention. System 10 is mounted on a base plate by means of vibration block holders and brackets described hereinafter with reference to FIG. 5. System 10 includes a random chip dispenser 12 which dispenses randomly oriented chips in a random, somewhat metered fashion across the upper rear edge of system 10, into that part of system 10 referred to as the first stage preliminary orienter 20. In the illustration of FIG. 1, random chip dispenser 12 is illustrated as a vibratory feed bowl which has a discharge chute 14 that moves back and forth across the rear edge of system 10. However, dispenser 12 can be any type of device which dispenses and meters parts across the upper rear edge of system 10 in a fairly uniform volume. Dispenser 12 itself can move back and forth across the rear face of system 10, or dispenser 12 can be a stationary fixture with a discharge tube or track moving back and forth across the back face of system 10. The vibratory feeder bowl illustrated is well known in the prior art.

Referring to FIG. 2, first stage preliminary orienter 20 performs the general basic end to end lengthwise orientation of the dispensed parts. As an integral part of the multiple rail vibratory feed system 10, this preliminary orienter is positioned at a small angle relative to the main feeder plate 30, as illustrated in FIG. 1. The angle of the first stage preliminary orienter plate 20 relative to the main feeder rail plate 30 can vary from approximately 15° to 40°. Maximum performance in preliminary orientation is attained at about 20°.

Preliminary orienter 20 is milled from an aluminum plate and has a plurality of individual rails 22 (57 rails in the embodiment illustrated). Each of rails 22 has two general configurations, FIG. 2. The configuration of the upper portion 23 of each rail 22 is a symmetrical lower third of a circle. The depth of these grooves could be lowered to one-half circle without seriously impairing performance. This configuration is illustrated in FIG. 2a. The configuration of the lower portion 24 of rails 22 is illustrated in Figure 2b.

First stage preliminary orienter 20 is not indispensible to the practice of the invention. It increases the net orientation rate by about 20%. Without preliminary orienter 20, system 10 will still perform, but with a loss of about 20% in net output due to an increased percentage of incorrectly oriented parts going into the reject holes.

The principal multiple rail feeder plate 30, illustrated in FIG. 3, has multiple rails 32 aligned with rails 22 of preliminary orienter 20. In the illustrated preferred embodiment, there are 57 rails 32. Rails 32 change configuration slightly from the rear to the front of feeder rail plate 30. Immediately adjacent to preliminary orienter 20, the upper portion 33 of rails 32 has the same configuration as rails 24. This configuration is illustrated in FIGS. 2b and 3a. As the cross-sectional views illustrate, each rail 24, 33 has a perpendicular sidewall 34 and a sloping base 35 which slopes upward to the vertical edge of the adjacent rail 32. The function of feeder rail plate 30 is to provide the second stage orientation of the chips. While feeder rail plate 30 is vibrating, the chips are gradually forced into a single file lengthwise orientation against vertical side wall 34, thus insuring proper orientation. The angle of slope in upper portion 33 of rails 32, those portions of the channels (rails) ahead of the discriminator area 36, is 15° in the preferred embodiment. This angle of slope can vary from 5° to 30°, with maximum performance at 15°.

As the chips are fed from the first stage preliminary orienter 20 to main feeder rail plate 30 they proceed along upper rail portion 33 to the discriminator area 36. The lower discriminator is integrally formed with feeder rail plate 30, while the upper discriminator 40 is an attachment positioned above the lower discriminator. That portion of feeder plate 30 from the discriminator area 36 forward to the pickup station terminal edge 31 is dimensioned to one of the subranges of chips which the multiple rail linear feed system 10 can handle. As mentioned supra, for the range of chip sizes for which the preferred embodiment of system 10 has been designed, four subranges can be processed by four variations in the dimensions of feeder plate 30 from the discriminator area 36 forward.

The lower discriminator is formed by cutting elongated holes 37 in each individual rail 32 so that vertical side wall 34 is left intact, though lowered in height by about one-third, and a sufficient portion of the sloping base 35 is left to allow chips in one subrange size to pass along the cutaway rail portion 38 lengthwise but not in any other orientation while proceeding along vertical sidewall 34. Cutaway rail portion 38 will have a width less than the width of the smallest chip in the subrange and more than one-half the width of the widest chip in the subrange. This width must also be less than one-half the length of any size chip in the subrange. The width of holes 37 can be adjusted for different sizes of chips by an additional cut in one side as illustrated in FIG. 3. Any chip which is not oriented lengthwise in single file against vertical sidewall 34 will fall into a hole 37 as it passes along cutaway rail portion 38. The cross-sectional view of FIG. 3b illustrates the configuration of cutaway rail portion 38 and the differences with upper rail portion 33. Chips falling through holes 37 in discriminator area 36 fall into a reject tray (not shown).

Having passed through the discriminator area 36 on sloping cutaway rail portion 38, the chips then pass on to lower rail portion 39 of main feeder plate 30, where they are rotated slightly (15° in the preferred embodiment) so as to be positioned parallel to the surface plane of feeder rail plate 30. This rotation is accomplished by allowing the chips to proceed to a milled portion of rail base 35 where the slope is eliminated and the flat rail width is equivalent to the width of the widest chip in the subrange. The channels in lower rail portion 39 can vary from 0° to 30° with maximum performance at 0°. FIG. 3c is a cross-sectional view of lower rail portion 39. As chips pass down lower rail portion 39 they are oriented in these rails 39 lengthwise in single file along vertical sidewall 34. The chips then proceed to pick-up area 45, in which the tops of sloping base 35 are milled away to permit a pick-up device to be positioned over the rails. A cross-section of area 45 is shown in FIG. 3d. Each row of chips stops at terminal bar 31 which forms the end of the pickup area 45.

Figure 4:
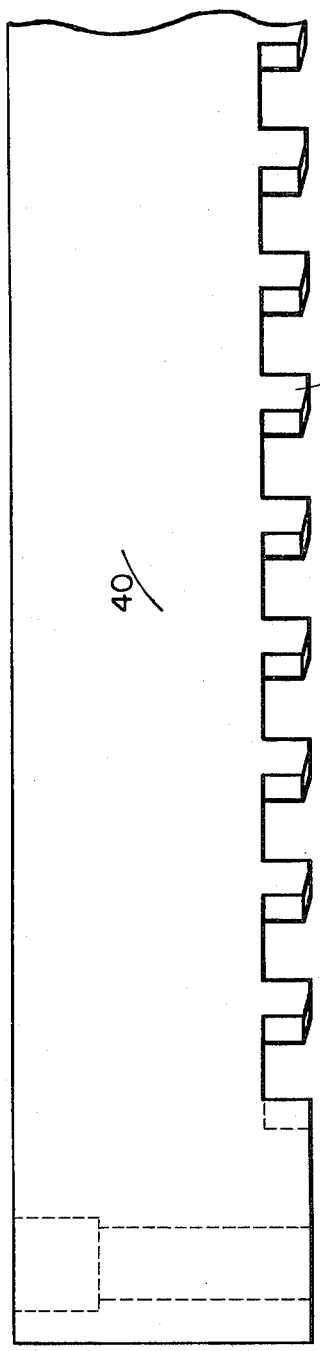
FIG. 4 is a front perspective view partially cut-away of the upper discriminator of the system of FIG. 1.
Figure 4A:
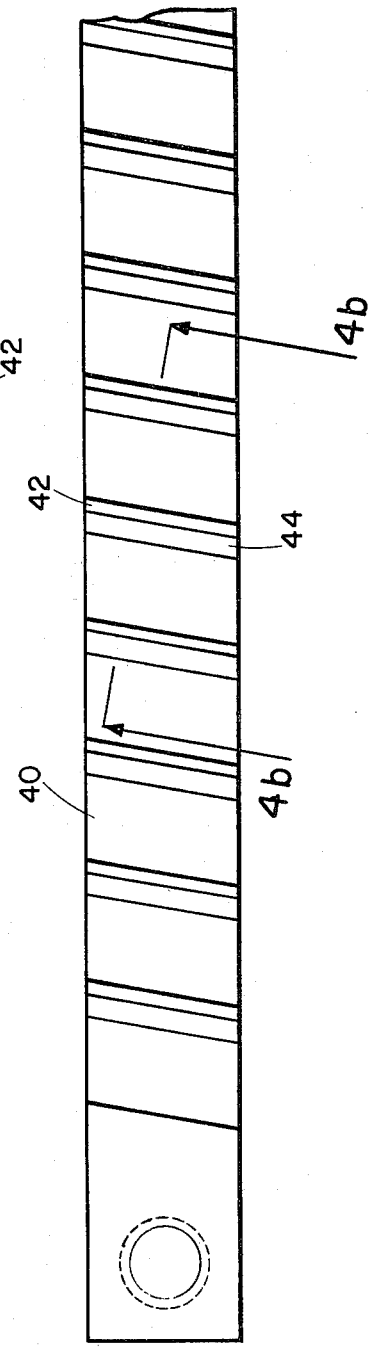
FIG. 4a is a bottom view of the upper discriminator of FIG. 4.
Figure 4B:
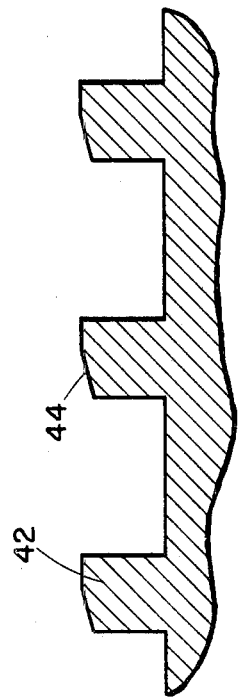

FIG. 4 is a front plan view of upper discriminator 40, which is a bar placed over the discriminator area 36, the bar having protruding downward therefrom a plurality of projections 42, one for each rail. These projections 42 are positioned, in the preferred embodiment, at an angle of 10° from the perpendicular of the leading edge of bar 40. This angle can range from 5° to 30°. The purpose of the upper discriminator is to eliminate the "doubles", that is, chips that are laying on top of other chips in the rails. As chips pass under upper discriminator 40, projections 42 block the passage of any "doubles", the angled projections 42 forcing the doubles to fall off the lower chips by moving them over until they fall into the discriminator holes 37. FIG. 4a is an inverted plan view of upper discriminator 40 showing angled projections 42. FIG. 4b is an inverted cross-sectional view taken from FIG. 4a. This view illustrates the lower surface of angled projections 42 which have a partially angled lower surface 44, in the preferred embodiment 15°, to correspond to the angle of the sloped base 35 of the rails 32 positioned under upper discriminator 40. This permits properly oriented single chips to pass under upper discriminator 40 undisturbed. All chips feeding through the discriminator area 36 will be properly oriented.

Figure 5A:
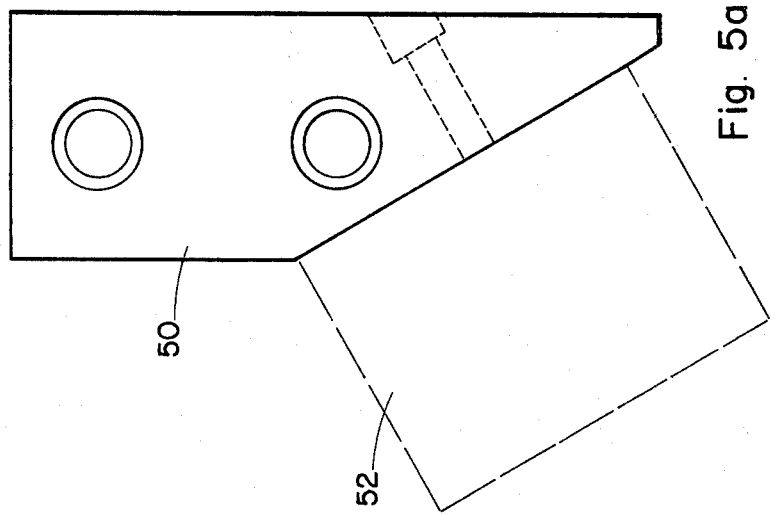
FIGS. 5a and 5b are top plan and side plan views of the vibratory block holders of the system of FIG. 1.
Figure 5B:
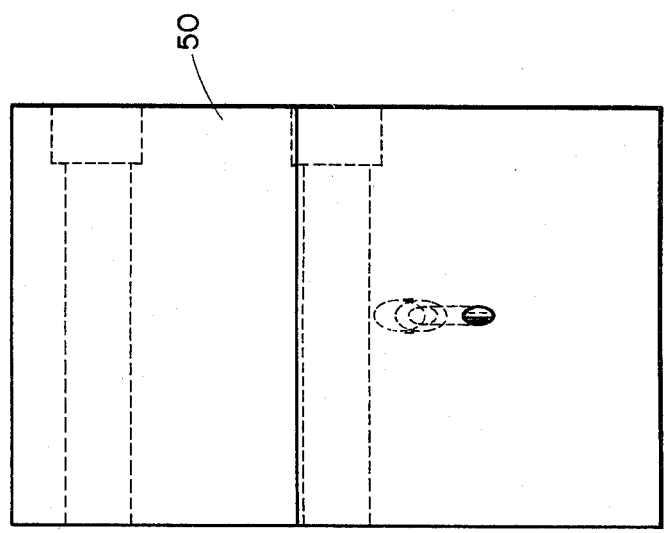

FIGS. 5a and 5b are top and side views respectively of the vibratory block holder 50 of the present invention. The multiple rail feeder plates consisting of the preliminary orienter 20, the feeder rail plate 30 and upper discriminator 40 form one operating unit which is secured to the vibratory block holder 50. The base of vibratory block holder 50 is attached to a base plate (not shown) in a conventional manner. Vibratory block 52 (FIG. 5a) is a conventional unit which provides linear vibratory motion, as well as a side angle motion, due to the blocks 52 being positioned at a 45° angle to the travel of the chips, (described infra) to move the chips lengthwise as well as move them tightly against the vertical side 34 of rails 32. The vibratory block holder 50 provides the attachment points between the vibratory block 52 and the feeder rail plate 30. The other side of the vibratory block 52 is attached by an angle plate to the base plate. The vibratory blocks 52 are positioned at 45° angles, in the preferred embodiment, to provide vibratory motion at approximately 45° to the line of feed. The vibratory block 52 is a standard commercially available part which needs to be matched in size with the size of the multiple rail linear feeder. The attachment angle can vary from 10° to 70°, with maximum performance at 45°. The multiple rail feeder plate 30 when secured to the vibratory bock holders 50 is positioned on a plane parallel to the plane of the base plate to insure a smooth feed of chips toward the pickup end bar 31.

In the system operation, a vibratory feeder or equivalent dispenser 12 randomly deposits randomly oriented chips across the rear edge of first stage preliminary orienter 20. Vibratory motion, the shape of the upper rail portion 23 and the downward slope of preliminary orienter 20 cause the chips to become oriented lengthwise and feed downward to the feeder rail plate 30. On feeder rail plate 30 the chips are further oriented by the linear vibratory motion, the chips tending to even out into single file lengthwise in each rail 32 until they reach the discriminator area 36. The lower reject discriminator holes 37 allow all chips that are misoriented crosswise to fall away from partially cutaway rail portion 38. The doubles, chips on top of other chips, are also pushed into the reject holes 37 by the upper discriminator 40. Thus, the discriminators in the discriminator area 36 insure that all the chips in the multiple rows 32 are properly oriented. The chips then rotate 15° by being fed to a flat bottom slot 39 in rails 32 that blends in with the 15° angle in rails 32. The chips come to rest against terminal bar 31 which forms the boundary of the pickup station 45.

The multiple rail feeder system 10 separates and properly orients chips into multiple rows of single file lines. A pickup bar (not shown) is then able to pickup multiple chips, one from each row (rail), from terminal 31 for further processing. This multiple rail system proportionally increases the quantity of chips that can be used for processing for each cycle of the pickup motion.

I claim:

1. An improved multiple rail linear vibratory feeder system for orienting parts into multiple rows of single file, having means comprising:
    means to dispense randomly oriented parts into each of said rails of said feed plate at a first end thereof;
    means to vibrate said feed plate such that said parts move from a first end thereof to a second end thereof, whereby the movement of said parts along said rails effects a desired orientation of said parts at the end of their travel along said rail;
    a linear feed plate;
    a plurality of rails formed in one surface of said plate;
    each of said rails having at least one side wall and a base; each of said rails having a sloping base from its first end to a point beyond a discriminator area, the angle of slope ranging from 5° to 30°; each of said rails having a sloping base from a point adjacent said discriminator area to its second end, said angle of slope ranges from 0° to 30°;
    means positioned between the ends of said feeder plate to discriminate between properly oriented parts and misoriented parts, said means forming a discriminator area along each of said rails;

means to remove said misoriented parts from said rails in the direction of feed, such that only properly oriented parts arrive at said second end of said feeder plate;

said discriminator area including an upper discriminator and a lower discriminator, said lower discriminator comprising:

an elongated hole cut into each of said rails such that one vertical sidewall and an adjacent portion of the angled base remain in tact, said remaining portion of said base track being sufficient to allow a properly oriented part to pass over it without falling into said hole;

said hole being of a size sufficient to permit a misoriented part to fall off said track and through said hole;

said upper discriminator comprising:

a bar secured to said feeder plate in said discriminator area above and transverse to said lower discriminator holes;

said bar having a plurality of projections, one for each rail, extending downwards toward said rails, each of said projections being dimensioned to permit a single part to pass under it along one of said rails;

a portion of the lower surface of each of said projections being angled so as to be parallel to the surface of the angled base of each of said rails;

said projections extending downward from said bar and positioned at an angle to the leading edge of said bar and directed over said lower discriminator holes such that said projections will cause parts lying on top of other parts in each of said rails to be pushed toward and through said discriminator holes;

wherein the lower surface angle of said projections ranges from 5° to 30°; and a terminal bar at the second end of said feeder plate.

2. The multiple rail linear feeder system of claim 1 further comprising:

a first stage preliminary orienter plate;

said preliminary orienter plate having a plurality of rails, said rails corresponding on a one-to-one basis with the rails on said linear feeder plate;

said preliminary orienter plate being secured to the first end of said linear feeder plate at an angle thereto and being positioned to receive said randomly dispensed chips;

said rails on said preliminary orienter being configured at one end to effect a rapid orientation of said parts and at the other end to conform to the configuration of rails on said linear feeder plate to effect a smooth flow of parts, said rails of said first stage preliminary orienter being configured in a generally hemispherical shape over most of their length.

said rails of said first stage preliminary orienter being configured to match the configuration of the rails in said feeder plate along the portions of said rails adjacent to said feeder plate.

3. The system of claim 1 wherein the angle of slope of said sloping base from its first end to a point beyond a discriminator area is 15°.

4. The system of claim 1 wherein said angle of slope of said sloping base from a point adjacent said discriminator area to its second end is 0°.

5. The system of claim 1 wherein the lower surface angle of said projections is 15°.

6. The system of claim 1 wherein said projections are angled from the perpendicular to said leading edge of said bar from 5° to 30°.

7. The system of claim 1 wherein said projections are angled from the perpendiclar the leading edge of said bar at an angle of 10°.

* * * * *